June 25, 1929.  A. C. BURRAGE  1,718,215
GREENHOUSE CONSTRUCTION FOR THE MAXIMUM RECEPTION OF SUNLIGHT
Filed Nov. 12, 1926  2 Sheets-Sheet 2
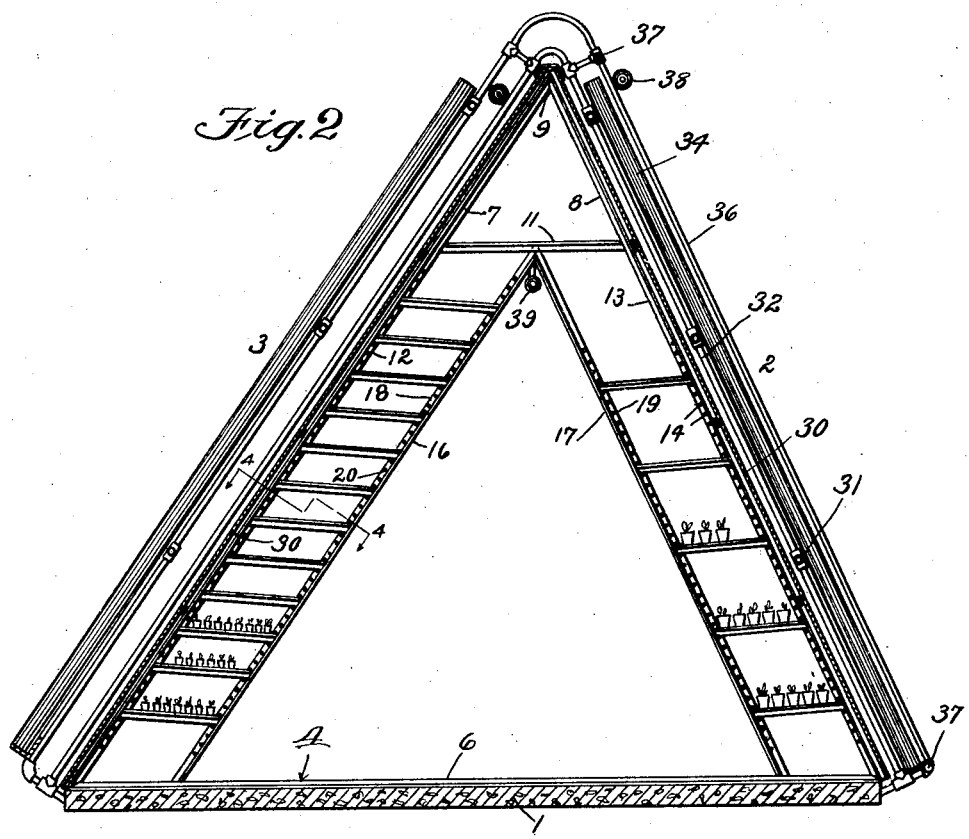
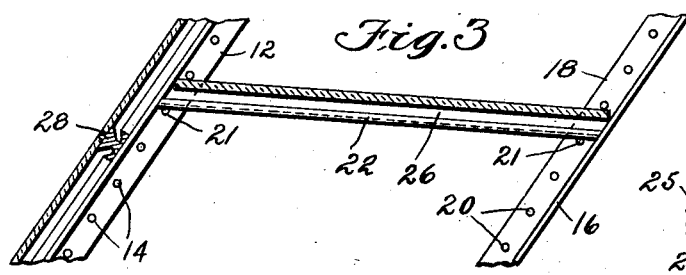
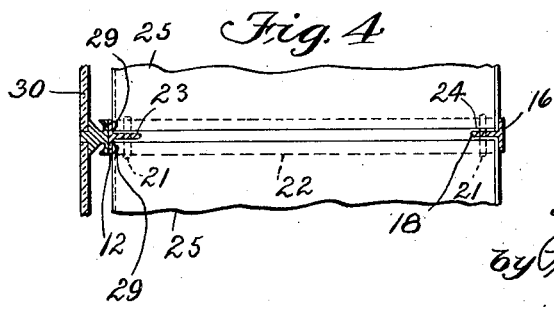
Inventor
Albert C. Burrage
Att'ys Patented June 25, 1929.

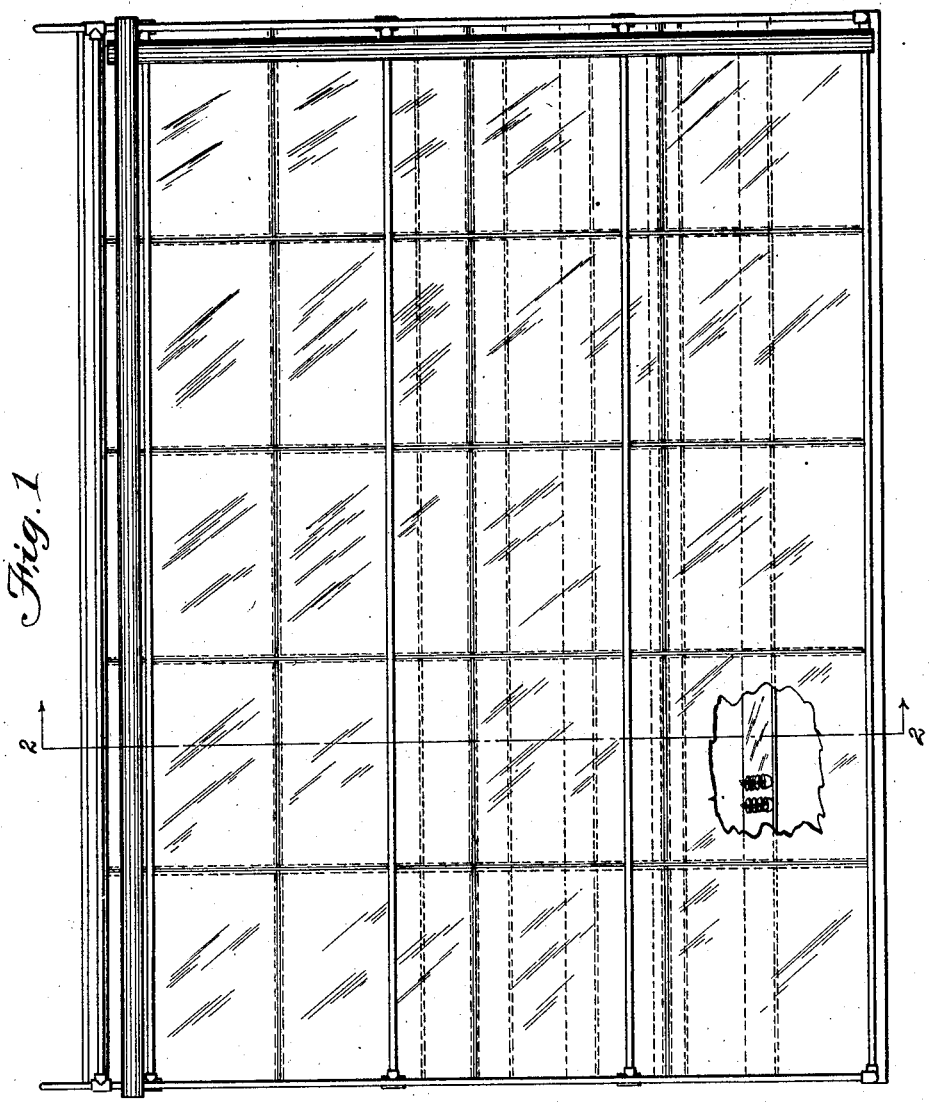

1,718,215

UNITED STATES PATENT OFFICE.

ALBERT C. BURRAGE, OF BOSTON, MASSACHUSETTS.

GREENHOUSE CONSTRUCTION FOR THE MAXIMUM RECEPTION OF SUNLIGHT.

Application filed November 12, 1926. Serial No. 147,935.

This invention relates to glass houses or greenhouses, and more particularly to a greenhouse construction adapted for the efficient reception and utilization of sunlight.

It has heretofore been observed by horticulturists that, owing to the reflection of a large part of incident light impinging upon a glass roof, the amount of light which passes through the glass and reaches the contents of the house is greatly diminished. The proportion of light thus lost is greater the farther the path of the incident ray deviates from a perpendicular to the glass surface. Hence, roofs which are relatively flat or form but an acute angle with the plane of the horizon receive rays of light from the sun at a low angle and deflect a substantial proportion of the available light. Consequently so much of the light as is thus deflected does not reach the interior of the house and is not available. Moreover, on account of the refraction of the glass, such roofs also dissipate a considerable part of the light which is transmitted. A third cause of loss of effective sunlight in glass houses—for example of the ultra violet rays or of selective portions of the visible spectrum,—may be attributed to the specific absorption characteristics of the glass. In some cases these losses are much larger than is generally supposed, and the quality of the light thus lost is often especially desirable for the plants. A further reduction of the available sunlight is often caused by the accumulation of dirt, water, snow, ice or other foreign matter upon the glass panes.

But in addition to these losses of natural sunlight there may be mentioned the loss of light due to the angular variation or apparent seasonal course of the sun, with respect to the greenhouse. Thus at midday on June 21 for example (in the northern latitude of say 42° 15′) the sun is at an elevation of about 72° more or less, from the horizon, while at midday on December 21 it is but 24° 12′ above the horizon. Thus it is obvious that the noon elevation of the sun at any given place varies by a certain amount every day. Moreover in addition to this seasonal fluctuation it is to be remembered that during the apparent diurnal course of the sun (with respect to the greenhouse) its angle of elevation is at other times during the day always less than at noontime, which is in fact the daily maximum, and that the maximum noontime duration is only momentary. Accordingly, while a greenhouse roof may have a relatively low slope and receive the sunlight at noon nearly perpendicular to its glass surfaces there is a large part of the day or of the sunlight hours, during which the light strikes the roof at a low or very acute angle. Consequently such light is largely reflected from greenhouse roofs as usually constructed and hence rendered ineffective with respect to the plants inside.

A further consideration, with regard to the usual greenhouse roof is that while the full midday sunlight may be far too strong for the plants and cause serious burning, it is nevertheless transmitted with the greatest proportional degree of efficiency to the interior of the house at this time of the day and on the other hand the less intense sunlight of the morning and afternoon which might advantageously be permitted to fall directly upon the plants and which continue through a much larger proportion of the daylight hours, is transmitted into the greenhouse at a rapidly decreasing degree of efficiency and consequently in greatly diminished ultimate quantities.

Still further reduction of the available sunlight may be caused by the use of bulky framework, wide opaque shelves, and the like as well as by inefficient and undesirable arrangements of the plants so that one row of plants may shade another.

As a result of such reductions of the sunlight which falls upon a greenhouse roof, the quantity of effective sunlight which actually reaches the plants within is in many instances considerably reduced and in general is much less than the total amount of sunlight which is in fact available and of a quality suitable for direct application.

In greenhouses of the structures heretofore employed, shelves have not been placed one above another, but benches have been used almost exclusively and in some instances step-like benches of wood have been employed, as for example through the middle of the greenhouse.

In addition to the desirability of rendering a large part of the sunlight available for use within the greenhouse, it is also desirable to efficiently and effectively apply the sunlight to the plants and to provide for as many plants as is practicable within a given space. It is nevertheless necessary that all of the plants shall be so positioned as to permit of the usual care such as watering, weeding, and the like, without moving or interfering with the other plants. It is also desirable to provide means for accommodating the plants throughout their periods of growth with ample space and yet without the necessity of resorting entirely to the use of other houses.

It is therefore an object of this invention to provide a greenhouse which shall mitigate or avoid these deficiencies and which shall be adapted properly to receive and effectively to transmit a large proportion of the total available sunlight to the interior of the house. It is a further object to efficiently and effectively apply the thus available sunlight to as many plants as may be practicable consistent with the proper care of the plants and management of the operation of the greenhouse. Other objects of the invention will appear from the following disclosure.

The present invention includes in general the provision of a greenhouse which is characterized by having a transparent roof or pair or roofs (typically forming a wide angle with the horizontal plane which may for example vary in any given location and for specific purposes from approximately 45° to something less than 90°) and which is further characterized by having a series of slightly sloping shelves adjacent to the inner or under side of the roof, each of said shelves projecting beyond the shelf below at its inner edge and beyond the shelf above at its outer edge or the edge adjacent to the roof.

The angle of the roof with the horizon will be altered according to the different latitudes, the intended uses of the greenhouse and the different seasons of the year. Thus, at Boston (latitude of approximately 42° 15′) if the roof stands at 65° 48′ to the horizontal it is nearly or substantially perpendicular to the sun's rays at noon time on December 21. At noon in other seasons of the year the angle may be appreciably less than 65° 48′ to receive the direct rays (of the noonday sun) and on June 21 it would need to be at approximately 18° only from the horizontal. As already pointed out, however, it is frequently not desirable to transmit the full amount of the noonday sunlight while at other parts of the day it is desirable to obtain the full light value and accordingly a higher angle than that for the noonday sun is more effective throughout the greater part of the day. In general, therefore, the exact angle will be determined by the location and by the specific light conditions required. This will usually be a mean or average value taking into account the seasonal position of the sun, the intensity of the sunlight at the point in question and the relative durations of such intensities, and like factors, with respect to the requirements of the plants for which the greenhouse is intended to be used.

It is not necessary or advisable, however, to have the angle between the roof and the horizontal approach very closely to 90°, for the reason that the sunlight, even at the actual moment of sunrise and sunset is rarely precisely horizontal but more often already presents an appreciable angle of elevation with the horizontal. For other reasons an extremely wide angle is not desirable, because a series of shelves placed adjacent to it would then stand directly one above another and permit the drainage of water from one shelf to the plants on the next shelf below. Other and more specific features of the invention will appear from the following description.

A typical instance of the practical application of the invention will be described with reference to a greenhouse especially adapted for the growing of orchid seedlings as representative of its adaptation to conditions of actual practice, reference being had to the accompanying drawings in which:

Fig. 1 is a side elevation of the greenhouse;

Fig. 2 is a cross-sectional view in the plane 2—2 of Fig. 1 in the direction of the arrows;

Fig. 3 is a detail cross-section of a shelf, and its associated shelf-supporting members, rafters and frames;

Fig. 4 is a horizontal section and view of the shelf, shelf-supporting members, rafters and frames along section line 4—4 of Fig. 2 in the direction of the arrows; and Fig. 5 is an enlarged cross-section and view of a shelf bracket.

In the drawings, numeral 1 indicates the floor of the greenhouse while numerals 2 and 3 refer generally to the pitches of the roof, which may be characterized as the sunnier and shadier sides, respectively.

The floor 1 may be made of concrete or other suitable material and serves to receive and support the roofs 2, 3, and such other structure as may be required. The supporting and reinforcing structure for the roofs may be readily fashioned from light weight T-iron and is preferably made in the form of generally triangular units 4, each having a base member 6 affixed to the floor 1 and two upright rafter members 7, 8, which are fastened to the base member 6 at the ends and welded to each other at or near the ridge pole 9. In the specific instance illustrated rafter 8, for supporting and reinforcing the roof on the sunny side of the house makes an angle of 65° with the base member and the rafter 7 for the roof on the shady side of the house forms an angle of 55° with the base member. The angle which the roofs form with each other at the ridgepole or top of the house in the instant case is therefore 60°. Connecting the rafter members 7, 8 there may be provided a re-enforcing cross piece 11. A plurality of such triangular supporting and reinforcing units 4 are spaced apart longitudinally of the house in upright position at suitable distances and in alignment with each other to provide adequate support for the roofs. But even with such light framework the smaller the number used the better the result obtained, because the shadows which they cast are thereby reduced.

The webs 12, 13 of the T-iron rafters 7, 8 are directed inwardly of the triangular unit or of the greenhouse and are provided with shelf-engaging means,—adjustable or spaced apart substantially from one end thereof to the other,—such as a series of holes 14. Parallel to each of the rafter members 7, 8, are provided opposed shelf-supporting means, including the interior rafters 16, 17 respectively, which are also made of T-iron and may be fastened at their lower ends to the base member 6 and at their upper ends to the re-enforcing cross piece 11. They are also so positioned that the webs 18, 19 thereon are opposed to the corresponding webs 12, 13 of the rafters 7, 8 respectively. The webs 18, 19 of the inner rafters 16, 17, are likewise provided with shelf-engaging means, such as a series of perforations, 20, which are slightly offset or sufficiently closely spaced with respect to the perforations 14, so that one of the latter perforations may be selected which stands slightly below any corresponding perforation in the series 14.

Pins 21 or the like, are provided of such size as to be received in and firmly engaged by the perforations in the desired opposed positions on the webs 12, 18 for example and to receive and sustain shelf-supporting elements such as the bracket strips 22. The latter are preferably made of wood and have notches 23, 24 at the ends which permit them to slip over the opposed webs 12 and 18 while the end surfaces are also beveled to correspond to the shape of the opposed flat surfaces of the T-iron rafter 7 and supporting beam 16, respectively. On each side of the strip 22 is provided a shoulder 20′ adapted to receive and support the end of a glass shelf 25 thereon, and also a longitudinal drainage channel 26, underneath the shelf.

Thus it will be clear that between the rafters and shelf-supporting elements on successive triangular units, a plurality of glass shelves 25 may be arranged and that they may be positioned on the inner side of both roofs of the greenhouse substantially from the top to the bottom in a successively overhanging relationship. When of substantially equal width each shelf projects at its outer edge beyond the shelf next above, and at its inner edge overhangs the edge of the next shelf below. This affords a maximum of direct exposure of the plants to the sunlight on the roof side of the series of shelves and, on the inner side of each shelf, permits water or other accummulation to drip from the edge of the shelf directly to the floor, without possibility of falling upon the plants below. Moreover, since the shelves are independently adjustable they may be spaced apart (with regard to the vertical heights to be allowed between them) in any way that may be required by the plants or the season of the year to present all of the plants on each shelf to the direct rays of sunlight. Whatever spacing arrangement of the shelves is adopted, the tiered arrangement of the plants upon them is preserved both with respect to their presentation to the sunlight and the free drainage of water and the like from the interior edges of the shelves. But in addition to this, and as a result of the wide angle which the roof forms with the horizontal plane, sufficient space is provided between the two series of shelves to permit ample freedom of movement to an attendant in caring for the plants. Ready access may also be had to any plant on any shelf in the greenhouse without touching or disturbing the others, whether the plant is on the lowest shelf (or on the floor beneath it) or on the highest shelf which it is practicable for a person to reach.

The framework on each side, for the glass enclosure of the roofs 2 and 3, is provided in any usual manner, as by laying vertically disposed wooden strips 28 (which may conveniently be fashioned from the same stock as bracket strips 22) along the outside surface of rafters 7 and 8 and fastening them thereto, as by screws 29. These receive panes of glass 30 in the usual way.

In order to screen the contents of the greenhouse from intense sunlight, when this may be necessary, a series of horizontal rods or pipes 31 are provided on the roof retained by sloping pipes or rods 32, upon which a roller curtain 34 may be unrolled laterally of the roof. A second course of pipes 36 spaced apart and above the first, may be attached to horizontal pipes 37 along the top and bottom of the roof, to support a roller curtain 38, adapted to be rolled up or down thereon. A mat or other heat insulating sheet may be put under the curtains in cold weather to retain the heat within the house and to reduce or prevent radiation. Ventilators will be provided, as at the ends, or sides,—as well as means for heating, watering and draining the house, which are well known, and are accordingly not shown in the drawings.

It will be clear that a greenhouse as thus constructed renders available within the house, a large proportion or substantially all of the total sunlight and also makes it possible to utilize substantially all of that which is transmitted through the glass roof. The shelves are readily adjustable and may range from the floor to near the top of the house on the sunnier side of the house while the light passing through the upper portion of the roof on this side strikes down through the plants upon the shelves under the roof on the shady side of the house.

But if shade is necessary for the plants on the latter shelves, the drop curtain 39 may be lowered in the center of the greenhouse and this result is accomplished. Accordingly, a very large number of plants may be easily warmed and cared for in a small greenhouse of the construction described. Moreover, when the plants (such as orchid seedlings) have grown to such a size as to require larger pots it is only necessary to space the shelves farther apart, as by removing alternate shelves, and sufficient space is then allowed for the larger plants and for the bigger pots which they require.

A further advantage of this construction lies in the fact that when the plants are watered the excess water striking or condensing upon the interior surface of the roof drains down through the channels in the sash or in the shelf brackets and thence directly to the floor while water upon the shelves runs to the edge (by virtue of their inward slope) and also drips directly on to the floor or along the surface of the inner rafters or T-irons to the floor, but in either case does not fall upon the plants below. The shelves may be of wood, metal, composition, or the like, but are preferably of transparent glass, so that such light as does not fall directly upon the plants on the sunny side of the house or nearer the glass, passes by them and through the shelves, and is thus available for such plants as may lie in the direction of its path, as for example on the next shelf below. Again, the projecting or overhanging relationship of the thus superposed tiers of plants exposes most of the plants in each row to the sunlight and beyond the shadow of those in the row above. In this way there is but very little of the available sunlight within the greenhouse which is not rendered effective for utilization by the plants.

While the greenhouse is thus adapted to receive, transmit, and render effective a large proportion of the sunlight for direct utilization by the plants which it contains, this amount of light may prove too intense at certain periods of the year for the plants which are being cultivated. The curtains or blinds are then unrolled to protect them. On the other hand in the colder periods of the year when all the available sunlight is required and at the same time radiation of heat to the outer atmosphere may become excessive, the curtains may then be replaced by sheets of straw matting or like insulating material.

It will be obvious to those acquainted with the art and science of horticulture that innumerable modifications and adaptations of the invention may and ordinarily will be resorted to in its specific applications to actual practice. Such modifications and adaptations are, however, to be considered as contemplated by the above disclosure and included within the terms of the following claims.

I claim:

1. A greenhouse, comprising a substantially transparent sloping roof, and a series of shelves arranged with their outer edges closely adjacent to the under side of the roof and each of said shelves sloping downwardly toward its inner edge.

2. A greenhouse, comprising a substantially transparent sloping roof, and a series of shelves arranged with their outer edges closely adjacent to the under side of the roof and each of said shelves sloping downwardly toward its inner edge, and forming an angle with the horizontal sufficient to cause the flow of water from the shelf but less than that at which sliding of the plants occurs.

3. A greenhouse, comprising a substantially transparent sloping roof, a series of inwardly sloping shelves arranged adjacent to the under side of the roof, and means for adjustably positioning said shelves severally with respect to the height from the floor, and with respect to the degree of slope.

4. A greenhouse, comprising a floor and a pair of transparent roofs characterized by forming a relatively wide angle with the floor, and a triangular re-enforcing unit therein.

5. A greenhouse, comprising a floor and a pair of transparent roofs characterized by forming a relatively wide angle with the floor, and a triangular re-enforcing unit therein, the members of said unit including a base member affixed to the floor and rafter members supporting the roof.

6. A greenhouse, comprising a floor, a pair of transparent roofs characterized by forming a relatively wide angle with the floor, and a triangular re-enforcing unit therein, said unit including a base member, a pair of rafter members for supporting the roof, and means substantially parallel to said rafter members to engage and support a series of shelves.

7. A greenhouse, comprising a floor, a pair of transparent roofs characterized by forming a relatively wide angle with the floor and a triangular re-enforcing unit therein, said unit including a base member, a pair of rafter members for supporting the roof, and adjustable means substantially parallel to said rafter members to engage and support a series of shelves.

8. A greenhouse, comprising a floor, a pair of transparent roofs, characterized by forming a relatively wide angle with the floor, and a triangular re-enforcing unit therein, said unit including a base member, a pair of rafter members for supporting the roof and means associated with said rafter members to engage and support a series of shelves, said shelves being in a position inclined inwardly from the adjacent roof.

9. A greenhouse, comprising a floor and a pair of transparent roofs characterized by forming a relatively wide angle with the floor, and a triangular re-enforcing unit therein, the members of said unit including a base member affixed to the floor and rafter members supporting the roof, and a series of shelves, each of said shelves supported on said rafter members and overhanging the shelf below.

10. A greenhouse, comprising a floor, a pair of transparent roofs characterized by forming a relatively wide angle with the floor and a triangular re-enforcing unit therein, said unit including a base member, a pair of rafter members for supporting the roof, and means associated with said rafter members to engage and support a series of shelves, said shelves having their outer edges adjacent the roof and their inner edges inclined downwardly and severally projecting beyond the inner edge of the shelf below.

11. A greenhouse, comprising a floor, a pair of transparent roofs characterized by forming a relatively wide angle with the floor and a triangular re-enforcing unit therein, said unit including a base member, a pair of rafter members for supporting the roof interior rafters parallel to said rafter members and means associated with said rafter members and said interior rafters adapted to engage and support a series of transparent shelves.

12. A greenhouse having a pair of transparent roofs, a triangular reinforcing unit for said roofs including two inclined rafter members, a cross piece joining said rafters, supporting means secured to said cross piece, and shelves adjustably carried by said rafters and said supporting means.

13. A greenhouse having a pair of transparent roofs, inclined outer rafters reinforcing said roofs, a cross piece joining said outer rafters, inner rafters parallel to said outer rafters and secured to said cross piece and shelves adjustably supported by said rafters.

14. A greenhouse having a pair of transparent roofs, inclined outer rafters reinforcing said roofs, a cross piece joining said outer rafters, inner rafters parallel to said outer rafters and secured to said cross piece and shelves adjustably supported by said rafters, the outer edges of said shelves being at said outer rafters.

15. A greenhouse having a pair of transparent roofs, inclined outer rafters reinforcing said roofs, a cross piece joining said outer rafters, inner rafters parallel to said outer rafters and secured to said cross piece and shelves adjustably supported by said rafters, the inner edges of said shelves being at said inner rafters.

16. A greenhouse having a pair of transparent roofs, a reinforcing unit for said roofs including inclined outer rafters, cross pieces joining said outer rafters, inner rafters parallel to and spaced from said outer rafters, bracket strips adjustably secured to said rafters and shelves resting upon said strips.

17. A greenhouse having a pair of transparent roofs, a reinforcing unit for said roofs including inclined outer rafters, cross pieces joining said outer rafters, inner rafters parallel to and spaced from said outer rafters, bracket strips adjustably secured to said rafters and provided with drainage channels and shelves resting upon said strips, the inner ends of said strips being below the outer ends whereby said shelves are inclined downwardly and inwardly.

18. A greenhouse having a pair of transparent roofs, a reinforcing unit for said roofs including inclined outer rafters, cross pieces joining said outer rafters, inner rafters parallel to and spaced from said outer rafters, bracket strips adjustably secured to said rafters and provided with drainage channels and shelves resting upon said strips.

Signed by me at Boston, Massachusetts, this 8th day of November, 1926.

ALBERT C. BURRAGE.